United States Patent
Xu et al.

[11] Patent Number: 5,480,344
[45] Date of Patent: Jan. 2, 1996

[54] POLISHING PROCESS FOR OPTICAL CONNECTOR ASSEMBLY WITH OPTICAL FIBER AND POLISHING APPARATUS

[75] Inventors: Jie Xu; Kenji Suzuki; Isamu Kinoshita, all of Ichihara, Japan

[73] Assignee: The Furukawa Electric Co., Ltd., Tokyo, Japan

[21] Appl. No.: 135,424

[22] Filed: Oct. 12, 1993

Related U.S. Application Data

[63] Continuation of Ser. No. 951,855, Sep. 28, 1992, abandoned.

[30] Foreign Application Priority Data

Oct. 1, 1991 [JP] Japan .................................. 3-280469
Feb. 17, 1992 [JP] Japan .................................. 4-061144

[51] Int. Cl.⁶ .................................................... B24B 1/00
[52] U.S. Cl. .................................. 451/28; 451/41; 451/42; 451/54; 451/56; 451/57; 451/58
[58] Field of Search .................................. 451/28, 36, 37, 451/41, 42, 54, 56, 57, 58, 59, 60, 63, 259, 272, 273, 274, 376

[56] References Cited

U.S. PATENT DOCUMENTS

| | | | |
|---|---|---|---|
| 3,566,224 | 1/1971 | Moldovan | 51/122 |
| 3,735,534 | 5/1973 | Mayo | 51/121 |
| 3,863,395 | 2/1975 | Brown | 51/121 |
| 4,384,431 | 5/1983 | Jackson | 51/283 R |
| 4,411,105 | 10/1983 | Raiha | 51/5 D |
| 4,492,060 | 1/1985 | Clark | 51/283 R |
| 4,587,768 | 5/1986 | Doyle | 51/124 R |
| 4,718,196 | 1/1988 | Seewald | 51/5 D |
| 4,839,992 | 6/1989 | Ishida | 51/123 R |
| 4,839,993 | 6/1989 | Masuko | 51/124 R |
| 4,905,415 | 3/1990 | Moulin | 51/124 R |
| 5,107,627 | 4/1992 | Mock | 51/283 R |
| 5,109,460 | 4/1992 | Baek et al. | 51/283 R |
| 5,123,219 | 6/1992 | Beard | 51/283 R |
| 5,184,433 | 2/1993 | Maack | 51/283 R |

Primary Examiner—Maurina T. Rachuba
Attorney, Agent, or Firm—Staas & Halsey

[57] ABSTRACT

Disclosed is a polishing process and a polishing apparatus for polishing an end face of a connector assembly with at least one optical fiber. The process comprising the steps of attaching at least one optical fiber with an optical connector made of different material from that of the optical fiber so that the optical fiber exposes from the end face of the optical connector and polishing the end face of the connector assembly with the optical fiber while pressing the same against a flat surface of a rotating abrasive wheel containing fixed abrasive grains with a constant load.

22 Claims, 13 Drawing Sheets

POLISHING PROCESS FOR OPTICAL CONNECTOR ASSEMBLY WITH OPTICAL FIBER AND POLISHING APPARATUS

This application is a continuation of application Ser. No. 07/951,855, filed Sep. 28, 1992, now abandoned.

BACKGROUND OF THE INVENTION

1. Field of the Invention

The present invention relates to a polishing process and a polishing apparatus for polishing the end face of an optical connector assembly with at least one optical fiber.

2. Description of the Related Art

When connecting at least two optical fibers in a detachable manner, the technique is employed of attaching optical connectors to the ends of the optical fibers to be connected and mating the end faces of two optical connector assemblies with the optical fibers. When connection is performed by this method, to raise the precision of connection of the optical fibers and ensure smooth transmission of the optical signals, it is necessary to polish the end faces (connection faces) of the optical connector assemblies with the optical fibers so as to ensure the end faces are flat and smooth.

Most general polishing process is a polishing process for polishing the end face of the optical connector assembly with the optical fibers by abrasive grains. In accordance with the conventional polishing process, in the first polishing step, use had been made of a grinding process using fixed abrasive grains so as to efficiently remove the adhesive adhering to the end face of the optical connector with the optical fiber, but in the later steps, the conventional practice had been to polish the end face of the optical connector by placing diamond and other abrasive grains on a buff etc. The polishing process based on the use of abrasive grains as employed in the later steps is called a polishing process using free abrasive grains, since the polishing step is performed with the abrasive grains not fixed to a buff or other polisher.

If optical fibers made of hard quartz glass and an optical connector made of soft plastic etc. are polished together such as the optical connector assembly with the optical fibers by a polishing process using free abrasive grains, the abrasive grains, which can move with respect to the buff or other polisher, will tend to collect at the soft material portion, that is, the end face of the optical connector, and there is thus the problem of more of the optical connector being cut away and the ends of the optical fibers sticking out.

In the case that sufficient flatness of the ends of the optical fibers is not secured, even if two optical connector assemblies are attempted to be joined, it is extremely difficult to bring the end faces of the optical fibers into direct contact. This connection error results in a larger connection loss and has an adverse effect on the transmission of the optical signals.

Further, if the optical connector assemblies are repeatedly attached and detached, there is liable to be damage to the ends of the optical fibers sticking out from the end face of the optical connector assembly and there is thus a problem with durability. Also, each time the optical connector assembly is attached or detached, the connection loss due to the connection error differs and thus there is a problem in reproducibility as well.

In particular, when connecting a multiple optical fiber bundle comprised of a bundle of a plurality of optical fibers, in addition to the above-mentioned problem, that is, the problem of the ends of the optical fibers sticking out from the end face of the optical connector, the lengths by which the optical fibers stick out from the end face of the optical connector assembly will also often differ.

Also, in the polishing process using free abrasive grains, even if the polishing speed is increased so as to raise the productivity of the polishing, slippage occurs between the abrasive grains and the buff or the end face of the optical connector assembly, so that the amount of polishing is not necessarily proportional to the polishing speed and there is the problem that the polishing time becomes longer and the polishing efficiency drops.

Further, with a polishing process using free abrasive grains, the abrasive grains (diamond etc.) used are discarded after each polishing step, so there is the problem of a high polishing cost.

On the other hand, in superprecision polishing technology, there is known a polishing process using so-called fixed abrasive grains where the polishing work is performed using a polisher with fixed abrasive grains. The conventional polishing process using fixed abrasive grains, however, adopted the technique of so-called feed control, where the polishing was performed while feeding the workpiece to the abrasive wheel.

If a brittle material like glass is polished by this feed control system, the range of brittle fracture becomes larger and scratches and other damage given to the workpiece are often seen. To eliminate this problem, fine and precise feed control of a level of tens of nm is required, so it is necessary and essential to employ a polishing apparatus having a high rigidity and a complicated control apparatus. There were therefore problems with cost and installation space. Accordingly, the polishing process using the fixed abrasive grains is almost adopted in the polishing process for the optical connector assembly. As one example, the Japanese unexamined Patent Laid Open Publication No. 3(1991)-196956 discloses the polishing process for the optical connector assembly using the fixed abrasive grains.

In the polishing process disclosed in the Japanese reference No. 3-196956, however, sufficient flatness of the ends of the optical connector assembly is not secured so as to result in a larger connection loss, if a polishing apparatus having a high rigidity and a complicated control apparatus are not employed.

The polishing process disclosed in the Japanese reference No. 3-196956 is briefly shown as FIG. 20 (a) to (e). As shown in FIG. 20, a top face "a" to "b" of workpiece 102, which is an optical connector assembly, is ground by a cup-shaped grinding wheel 100. In this process, actual grinding quantity "A" is shown as the following formula.

$$A = x - y$$

In the formula, "x" is a cutting quantity for grinding and "y" is elastic strain of the apparatus.

In this process, contact area of the grinding wheel 100 and the workpiece 102 changes and thereby grinding resistance changes in accordance with feeding of the workpiece into the grinding wheel. As a result, deflection of the apparatus changes and thereby actual grinding quantity changes in accordance with feeding of the workpiece, so that sufficient flatness of the ends of the workpiece 102 is not secured as shown in FIG. 21 which shows the flatness tendency.

Further, as shown in Japanese unexamined Patent Laid Open Publication No. 2 (1990)-131204, polishing film is used in a polishing process for an optical connector assembly. In this process, abrasive grains are easily to be dropped off from the polishing film, and thereby it is difficult to administrate the quality of the polishing process. As a result, it is difficult to secure efficient flatness of the optical connector assembly.

SUMMARY OF THE INVENTION

The present invention was made in consideration of these problems in the prior art.

An object of the invention is to provide a polishing process for polishing the end face of a connector assembly with high accuracy, at low cost, and efficiently.

The present invention, to achieve the above-mentioned object, provides a polishing process for a connector assembly with optical fiber comprising the steps of attaching at least one optical fiber with an optical connector made of different material from that of the optical fiber so that the optical fiber exposes from the end face of the optical connector and polishing the end face of the connector assembly with the optical fiber while pressing the same against a flat surface of a rotating abrasive wheel containing fixed abrasive grains with a constant load.

In order for efficiently polishing, the connector assembly with the fiber may be moved on the surface of the rotating abrasive wheel to change the polishing locus direction of workpiece.

The abrasive wheel may be a metal-bonded diamond wheel or a wheel which is called in this specification for a "liquid-bonded" wheel having characteristic of high-concentration and low bonding strength comprised by mixing and hardening powder of cerium oxide ($CeO_2$) or other powder with a liquid bond. It is possible to polish the optical connector assembly with the optical fiber by means of mechanochemical reaction in case of the liquid-bonded wheel.

The polishing step may comprise the plural polishing steps by means of different fixed abrasive grains wheel in each polishing step.

The present invention provides a polishing apparatus for an optical connector assembly with at least one optical fiber comprising: an abrasive wheel rotational drive means for mounting and rotating an abrasive wheel; a holding means for holding the optical connector assembly with the optical fiber so that the end face of the optical connector assembly with the optical fiber faces a flat polishing surface of the abrasive wheel mounted on the abrasive wheel rotational drive means; a movement means for enabling movement of the relative position of the end face of the optical connector assembly held by the holding means and the polishing surface of the abrasive wheel; and a constant load means for pressing the end face of the optical connector assembly with the optical fiber against the flat polishing surface of the rotating abrasive wheel.

According to a polishing process using a polishing apparatus of the present invention, the abrasive grains contact the polishing surface as a whole uniformly regardless of the distribution of hardness of the polishing surface and the ends of the optical fibers made of hard quartz glass will never stick out from the end of the optical connector. Because the end face of an optical connector assembly with optical fibers is polished while pressing it against fixed abrasive grains with a constant load.

Further, flatness beyond that of the abrasive wheel is obtained on the end face of the optical connector assembly, since flatness of the abrasive wheel is not only traced on the end face of the optical connector assembly but also the whole end surface of the optical connector assembly is always pressed against the abrasive wheel while the optical connector assembly moves reciprocally along the polishing flat surface of the abrasive wheel.

Further, in the polishing process of the present invention, the end face of the optical connector assembly is polished while pressing on the abrasive wheel with a fixed load, so even when polishing a brittle material such as glass, it is possible to suppress brittle fracture and it is possible to protect scratches to the workpiece.

Further, since fixed abrasive grains are used, if the polishing speed is increased, it is possible to raise the productivity of polishing proportionally to the speed and it is possible to considerably shorten the polishing time. Further, since the abrasive grains are not discarded after use, the polishing cost becomes cheaper than with a polishing process using free abrasive grains.

Since the flatness of the end face of the optical connector assembly is improved, it is possible to restrain connection loss due to connection error, when the optical connector assemblies are connected with each other.

Further, even if the optical connector assembly is repeatedly attached and detached, it is possible to prevent damage to the end of the optical fiber. Also, the durability is superior and at the same time the connection loss becomes uniform, so it is possible to provide an optical connector assembly superior in reproducibility.

Further, the polishing time can be shortened tremendously and polishing becomes possible at a low cost.

BRIEF DESCRIPTION OF THE DRAWINGS

Other objects and features of the present invention will be described in detail with reference to accompanying drawings, in which.

DESCRIPTION OF THE PREFERRED EMBODIMENTS

Below, a detailed explanation will be given of an embodiment of the present invention based on the drawings.

First, an explanation will be given of the construction of an optical connector assembly with optical fibers which is polished using the polishing process of the present embodiment.

Figure 5:
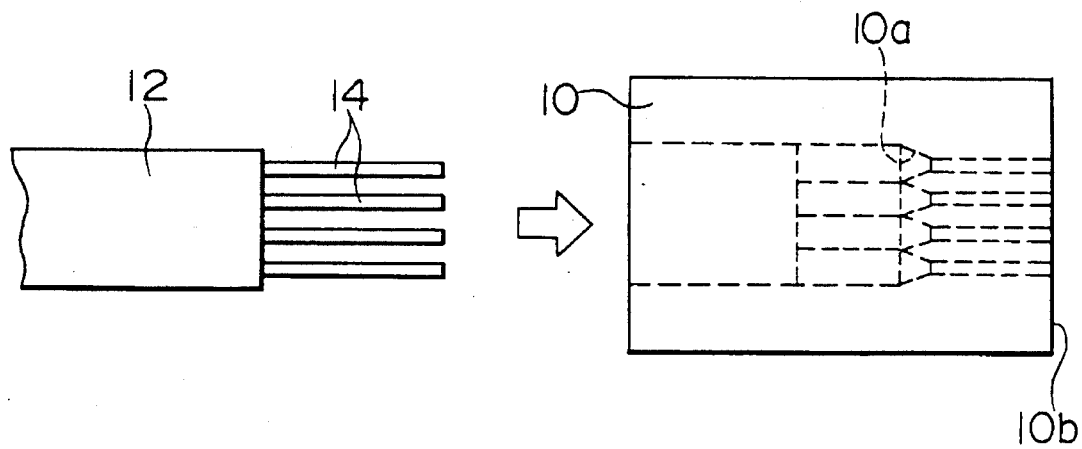
FIG. 5 is a plane view of the state of optical fibers and an optical connector as separate pieces to be polished by the polishing process of an embodiment of the present invention.
Figure 6:
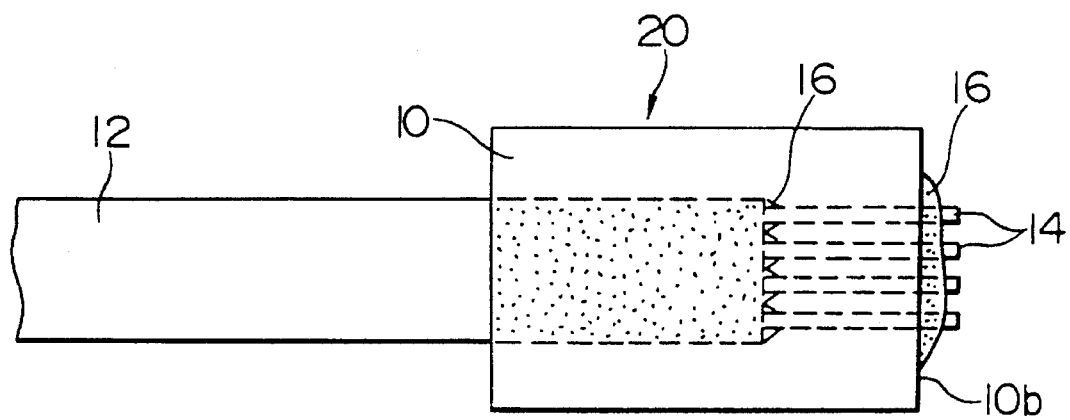
FIG. 6 is a plane view of an optical connector assembly with optical fibers polished by the polishing process of an embodiment of the present invention.

FIG. 5 is a plane view of the state of optical fibers and an optical connector as separate parts to be polished by the polishing process of the embodiment of the present invention, while FIG. 6 is a plane view of an optical connector assembly with optical fibers which is polished by the polishing process of the embodiment of the present invention.

As shown by FIG. 5 and FIG. 6, a hole 10a is formed in the optical connector 10. In the hole 10a is inserted the end of a tape-like multiple optical fiber bundle 12 comprised of an integral arrangement of four optical fibers 14 made of quartz glass, specifically, the stripped portion of the four optical fibers 14.

The optical fiber bundle 12 and the optical connector 10 are used to assemble the optical connector assembly 20 shown in FIG. 6 by joining them by inserting the end of the optical fibers 14 of the stripped tape-like multiple optical fiber bundle inside the hole 10a of the optical connector 10 to which an adhesive 16 is applied in advance. After this, the adhesive 16 is applied to the front end face 10b of the optical connector so as to completely affix the four optical fibers 14 sticking out from the front end face 10b of the optical connector 10.

The process for polishing the front end face of the thus obtained optical connector assembly 20 is explained below.

The optical connector 10 is formed by a plastic, while the optical fibers 14 are formed by quartz glass, as mentioned earlier, so there is a large difference in the hardness of the two. Therefore, if the front end face of the optical connector assembly is polished by a polishing process using free abrasive grains as in the prior art the abrasive grains will concentrate at the portion of the optical connector which is relatively small in hardness and the optical connector will be more polished, so the optical fibers 14 will stick out from the end face 10b of the optical connector 10.

Considering this problem, in the present invention, the end face of the optical connector assembly 20 is polished by a polishing process having a polishing step using a rotating abrasive wheel of fixed abrasive grains. In particular, the optical connector assembly 20 is polished while pressing the same against a flat surface of the rotating abrasive wheel with a constant load and moving the same with respect to the wheel rather than using the conventional feed control system.

Note that in the embodiment discussed below, the end face of the optical connector assembly is polished by a total of four steps, that is, a first polishing step to a fourth polishing step, but the polishing process of the present invention need only be a polishing process using fixed abrasive grains and a pressing load. The number of steps, the polishing conditions, etc. are not limited to those of this embodiment and may be changed in various ways.

When establishing four polishing steps, however, the efficiency becomes good since the greater the number of steps forming the fixed abrasive grain process, the better the efficiency. Further, removal of the adhesive by the fixed abrasive grains in the initial step is required in the same way as in the prior art.

Figure 7:
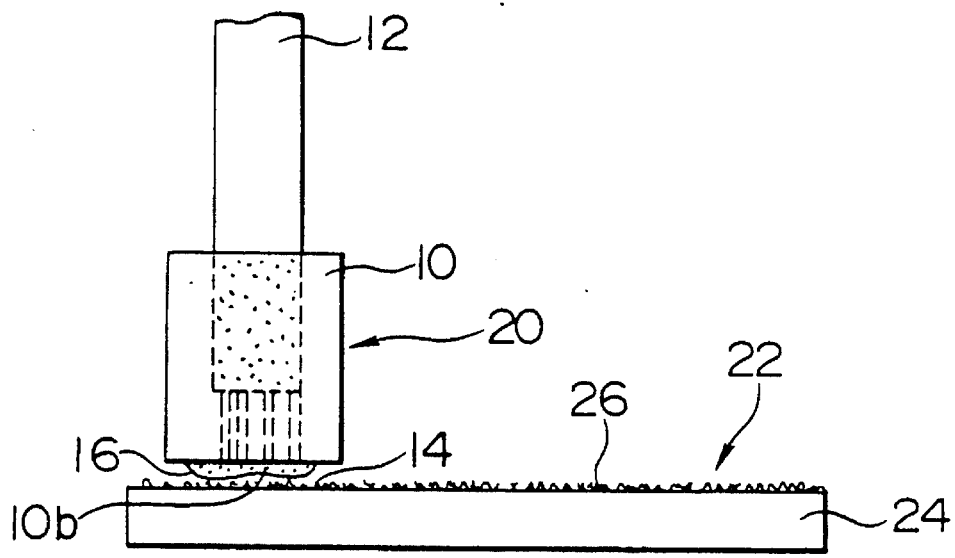
FIG. 7 is a side view of the first polishing step of an embodiment of the present invention.
Figure 8:
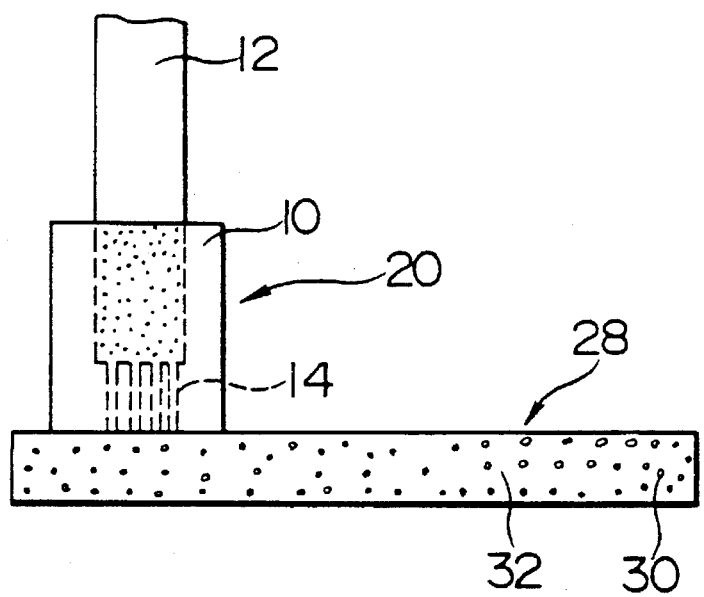
FIG. 8 is a side view of the second polishing step and third polishing step of an embodiment of the present invention.
Figure 9:
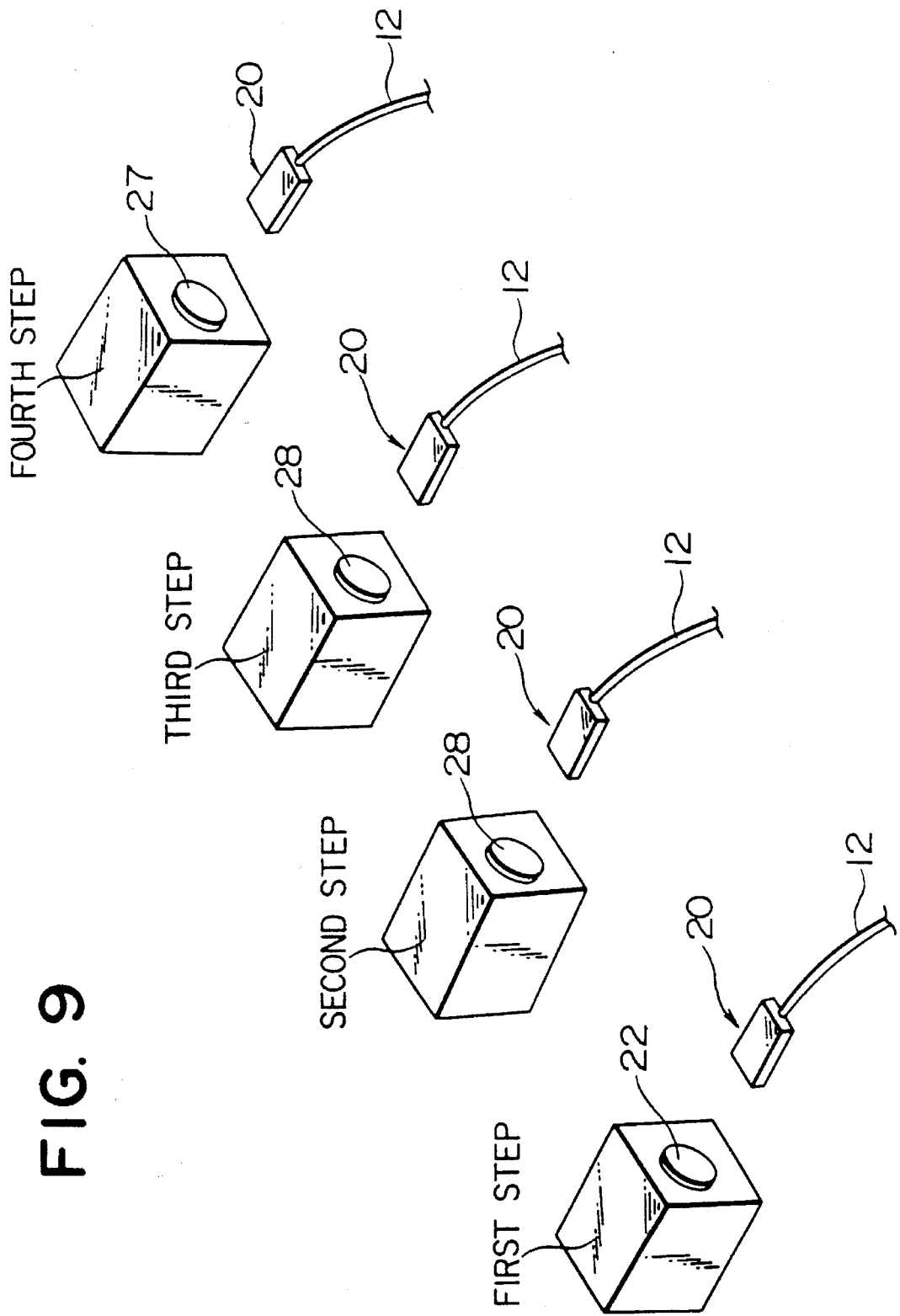
FIG. 9 is a schematic view of four polishing steps of an embodiment of the present invention.

FIG. 7 is a side view of the first polishing step according to an embodiment of the present invention, while FIG. 8 is a side view of the second polishing step and third polishing step according to the same embodiment. FIG. 9 is a schematic perspective view of four polishing steps.

In the first polishing step of the embodiment, as shown in FIG. 7, a diamond electrodeposited abrasive wheel 22 comprised of a metal plate 24 on the surface of which diamond 26 is electrodeposited is used to grind the end face of the optical connector assembly 20 so as to cut away the ends of the optical fibers 14 sticking out from the end face 10b of the optical connector and the adhesive 16 (note that in this specification, grinding is also sometimes referred to as polishing).

The roughness of the diamond electrodeposited fixed abrasive grain of the abrasive wheel used in the first polishing step should have a roughness in the range of no. 500 to no. 3000. Use of a abrasive wheel of around no. 700 is preferable.

Note that instead of the diamond electrodeposited abrasive wheel used in the first polishing step, use may be made of a resin-bonded diamond abrasive wheel or a metal-bonded diamond abrasive wheel.

The optical connector assembly from which the adhesive adhering to the end face and the optical fibers sticking out from the end face are ground in the first polishing step is next sent to the second polishing step shown in FIG. 8 where the end face is further polished.

In the second polishing step, polishing is performed using a metal-bonded diamond abrasive wheel 28 which is a fixed abrasive grain wheel comprised by bonding diamond abrasive grains 30 using a metal 32 as a bond. The roughness of the metal-bonded diamond abrasive wheel used in the second polishing step should be in the range of no. 1000 to no.

3000. Use of an abrasive wheel of no. 2000 is preferable. The roughness no. means a range of grain size of the abrasive wheel, for example, no. 2000 and no. 4000 mean respectively 3–8 μm grain size and 2–4 μm grain size. Further, the concentration factor of the diamond abrasive wheel is preferably from 75 to 125. The concentration factor is defined such that concentration factor 100 shows that 4.4 carats of diamonds are proportionally incorporated in one $cm^3$ of a abrasive layer of the wheel.

The next third polishing step, like the second polishing step, is one where the end face of the optical connector assembly is polished using the metal-bonded diamond abrasive wheel, but in this step, the polishing is performed using abrasive grains of a smaller size than the second polishing step.

The roughness of the metal-bonded diamond abrasive wheel used in the third polishing step should be in the range of no. 3000 to no. 5000. Use of a no. 4000 abrasive wheel is preferable. The concentration factor of the abrasive wheel is preferably from 75 to 125.

Note that instead of the metal-bonded diamond abrasive wheel used in the second polishing step and the third polishing step, use may be made of a resin-bonded diamond abrasive wheel comprised of diamond abrasive grains bonded by resin. However, the metal-bonded diamond abrasive wheel is more preferably used, since the lifetime of the metal-bonded diamond abrasive wheel is longer.

In the final fourth polishing step, as shown in FIG. 9, the end face of the optical connector assembly 20 is polished by a liquid-bonded abrasive wheel 27 having high concentration and low bonding strength comprised by mixing and hardening powder of cerium oxide ($CeO_2$) with a liquid bond.

In this polishing step, the mechanical polishing between the material of the optical fiber, that is, the quartz glass, and the cerium oxide and the chemical reaction induced by the mechanical energy of the same, that is, the mechanochemical reaction, results in melting of the polishing surface and disappearance of polishing scratches and the layer changed by the processing and makes it possible to polish the end faces of the optical fibers polished by the third polishing step to a further higher precision.

The roughness of the cerium oxide powder used in the fourth polishing step should in the range of no. 3000 to no. 10000. Use of no. 4000 cerium oxide powder is preferable.

Further, in this step, the similar effect is obtained even with use of aluminum oxide, chromium oxide, or silicon oxide instead of cerium oxide.

Also, the final finishing step, that is, the fourth polishing step, may be performed without using the liquid bond abrasive wheel of the fixed abrasive grain system, but by using the free abrasive grain system with powder abrasive grains of cerium oxide placed on a buff etc. In this case, the similar effect is obtained even with the use of aluminum oxide, chromium oxide, or silicon oxide instead of cerium oxide.

Further, it is found by the inventors that scratches and affected layer caused by the preceding polishing steps are securely eliminated by the final polishing step using the liquid-bonded abrasive wheel, even if the metal-bonded diamond wheel is used in the preceding polishing steps. Accordingly, damages to the optical connector assembly caused by using the metal-bonded diamond wheel make no problem.

Next, an explanation will be made of a polishing apparatus using the polishing process of the present invention.

Figure 1:
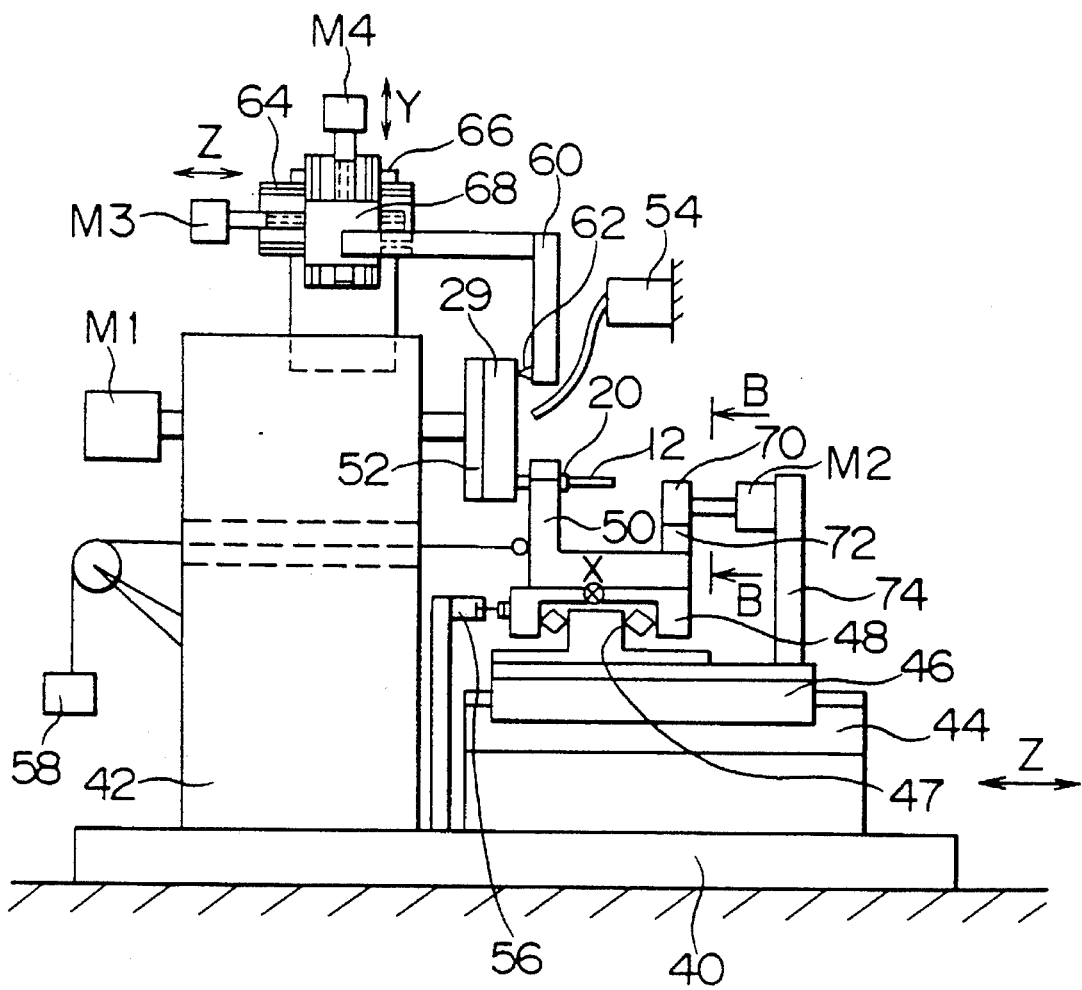
FIG. 1 is a side view of an embodiment of a polishing apparatus using the polishing process of the present invention.
Figure 2:
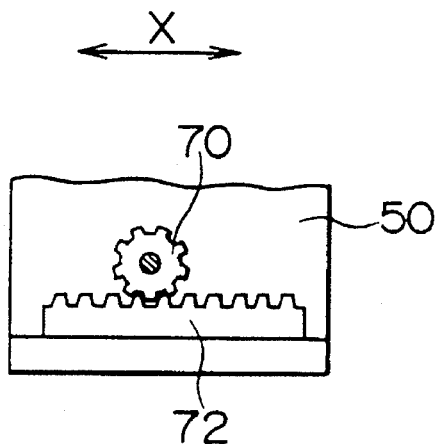
FIG. 2 is a front view along the arrow line B—B of FIG. 1.

FIG. 1 is a side view of an embodiment of a polishing apparatus using the polishing process of the present invention, while FIG. 2 is a front view along the arrow line B—B of FIG. 1.

At the rear of the machine bed 40 a column 42 is provided. At the top of this, an abrasive wheel rotational drive apparatus 52 is provided which mounts a metal-bonded diamond abrasive wheel or a liquid-bonded abrasive wheel, that is, a polishing abrasive wheel 29, and rotates the polishing abrasive wheel 29 by a motor M1 about a spindle having a horizontal axial line.

Further, at the front of the column 42, a linear guide 44 extending in the direction from the front to rear, that is, the Z-direction, is affixed to the bed 40. On this guide 44 is mounted a slider 46, which can move on the linear guide 44.

Also, a saddle 48 which can be in the right-left direction, that is, the X-direction, via the linear guide 47 is mounted on the slider 46. On this saddle 48 is affixed a holding apparatus 50 for holding the optical connector assembly 20.

A motor M2 is attached to a fixing member 74 emplaced on the slider 46. A pinion gear 70 is affixed to the front end of the rotational shaft. On the other hand, a rack 72 engaging with the pinion gear 70 is affixed to the holding apparatus 50. Therefore, if the rotational shaft of the motor M2 is rotated, the saddle 48 moves with respect to the slider 46 by the pinion gear 70 and the rack 72.

Further, a cylinder piston apparatus 56 is installed standing from the bed 40 to a position of the height of the saddle 48. When the piston of the cylinder piston apparatus 56 is moved forward, the saddle 48 moves forward in the Z-direction along with the slider 46.

Note that the optical connector assembly 20 is attached to the holding apparatus 50 at the forward position of the piston of the cylinder piston apparatus. Further, after the optical connector assembly 20 is attached to the holding apparatus 50, the piston is retracted and the end face of the optical connector assembly 20 is made to contact the polishing abrasive wheel 29.

On the other hand, a weight 58 acts on the holding apparatus 50. As mentioned above, when the piston is retracted, the holding apparatus 50 moves backward in the Z-direction along with the slider 46 and the front end face of the optical connector assembly 20 is pressed against the polishing surface of the polishing abrasive wheel 29 by a pressure in accordance with the weight of the weight 58.

Note that in the present invention, it is sufficient to press the end face of the optical connector assembly against the polishing abrasive wheel by a constant pressing pressure during the polishing, so the pressing pressure may be adjusted not only by the weight as in the present embodiment, but also by a constant load spring.

When the polishing abrasive wheel 29 is a liquid-bonded abrasive wheel as in the above-mentioned fourth polishing step, the abrasive wheel has a low bonding strength, so when the optical connector assembly 20 is polished, the polishing region of the wheel 29 is worn out by the optical connector assembly. Therefore, it is necessary to correct the polishing surface of the wheel 29 comprised of liquid bond abrasive wheel.

In the polishing apparatus of this embodiment, the polishing surface is corrected by the following structure. That is, above the column 42, there is mounted a Y-direction guide 66 which can move an L-shaped member mount 68 in the vertical direction, that is, the Y-direction, by a motor M4. The Y-direction guide 66 is attached to a Z-direction guide 64 so as to be movable in the Z-direction by the motor M3.

To the L-shaped member mount 68 is affixed an L-shaped member 60 mounting a truing tool 62 at its front end. The Z-direction guide 64 is used to move the truing tool 62 in the direction of thickness of the liquid bond abrasive wheel 29 to adjust the depth of cut and the Y-direction guide 66 is used to move the truing tool 62 in the parallel direction of the polishing surface of the liquid-bonded abrasive wheel 29 to correct the polishing surface as a whole to be flat.

Note that in FIG. 1, 54 is a machining fluid unit which supplies water or another machining fluid to the polishing surface during polishing of the optical connector assembly 20.

Further, as explained above, the means of correction of the polishing surface was explained with reference to the case of the polishing abrasive wheel 29 of FIG. 1 being a liquid-bonded abrasive wheel, but when this is a metal-bonded diamond abrasive wheel etc., the reference numeral 60 in FIG. 1 is a dresser apparatus and 62 is a dresser.

In this way, the polishing apparatus shown in FIG. 1 may be used in each of the steps of the first polishing step to fourth polishing step of the above-mentioned embodiment. In actual polishing work, four of the above polishing apparatuses are provided and the steps are split between them.

Next, a detailed explanation will be given of the polishing process of this embodiment using the polishing apparatus shown in FIG. 1 while referring to FIG. 3 and FIG. 4.

Figure 3:
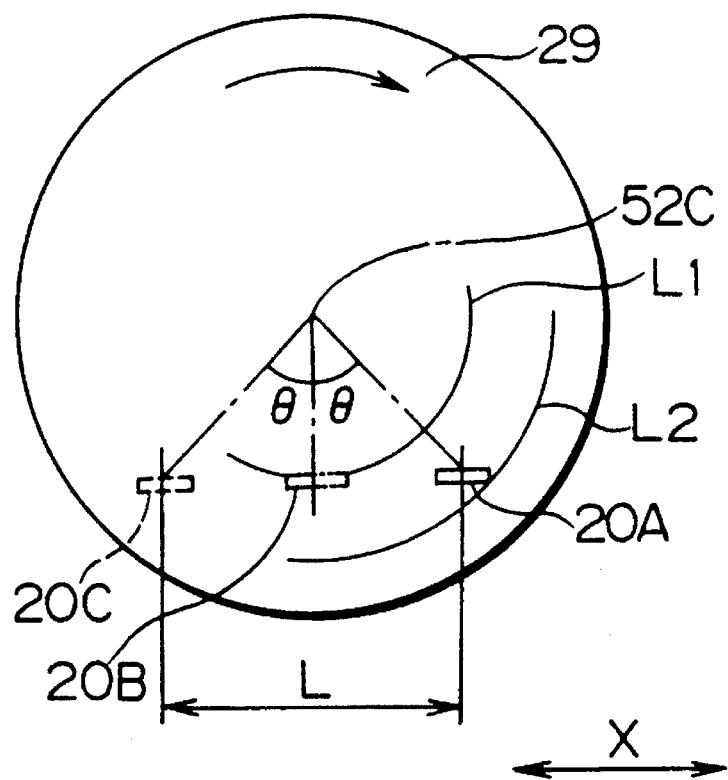
FIG. 3 is a view explaining the polishing process of an optical connector assembly by the polishing apparatus of FIG. 1.

FIG. 3 is a view explaining a polishing process of an optical connector assembly using the polishing apparatus of FIG. 1 and corresponds to a view of the polishing abrasive wheel 29 and the optical connector assembly 20 seen from the direction of B of FIG. 1. Further, FIG. 4 is a view of the end face of the optical connector assembly polished by the polishing process shown in FIG. 3.

The optical connector assembly 20 attached to the holding apparatus 50 moves linearly and reciprocally in the X-direction (the chord direction of the wheel 29) in the distance L between the position 20A and position 20C shown in FIG. 3 by the action of the rack 72 and pinion gear 70 when the motor M2 is actuated, but at the same time the polishing abrasive wheel 29 rotates about the center axial line 52C. Therefore, in the polishing surface of the polishing abrasive wheel 29, the region between the circle L1 and L2 is effectively used as the polishing region. It is preferable that the end face of the optical connector assembly is always in contact with the polishing abrasive wheel 29 during polishing step.

Figure 4:
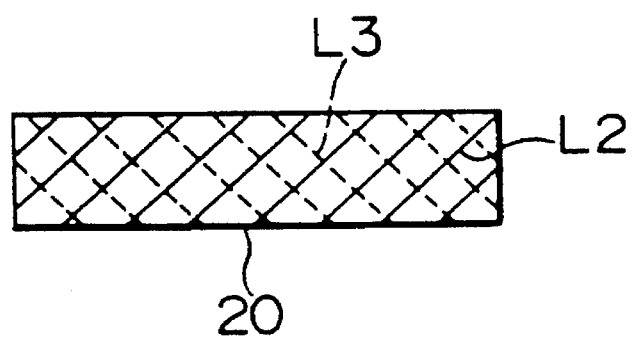
FIG. 4 is a view of the end face of an optical connector assembly polished by the polishing process shown in FIG. 3.

Further, as shown in FIG. 3, since the optical connector assembly 20 moves linearly in the X-direction while the polishing abrasive wheel 29 rotates, the polishing direction of the front end face of the optical connector assembly 20 is the direction of the line L2 shown in FIG. 4 when at the position 20A, but when at the position 20C, becomes the direction shown by the broken line L3. That is, the polishing direction of the front end face of the optical connector assembly changes gradually during this period. In particular, when the angle $\Theta$ shown in FIG. 3 is 45 degrees, the polishing directions L2 and L3 shown in FIG. 4 mutually intersect, and therefore these polishing conditions are preferable as the polishing process.

Note that the above-mentioned embodiment was explained taking as an example an optical connector assembly of a tape-like multiple optical fiber bundle and an optical connector, but the optical connector assembly polished by the present invention is not limited to this embodiment alone and may be an optical connector assembly of a single optical fiber and optical connector.

Next, a more detailed explanation will be made of an example for polishing the end face of an optical connector assembly by the polishing process of the present invention mentioned above.

Figure 10:
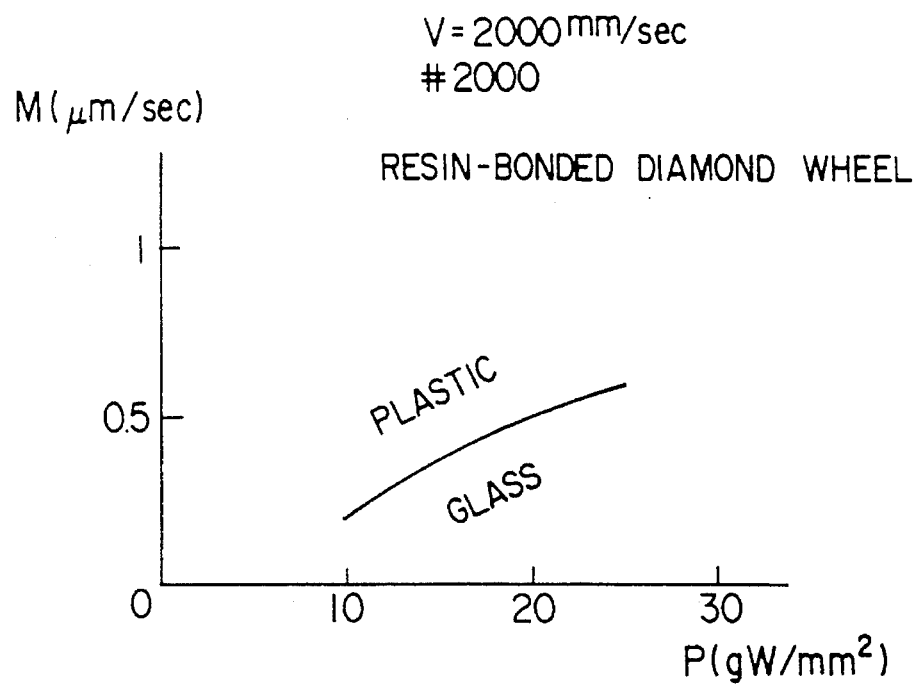
FIG. 10 is a graph of the results of polishing according to the polishing process of one embodiment of the present invention (relationship between pressing pressure and polishing rate)
Figure 11:
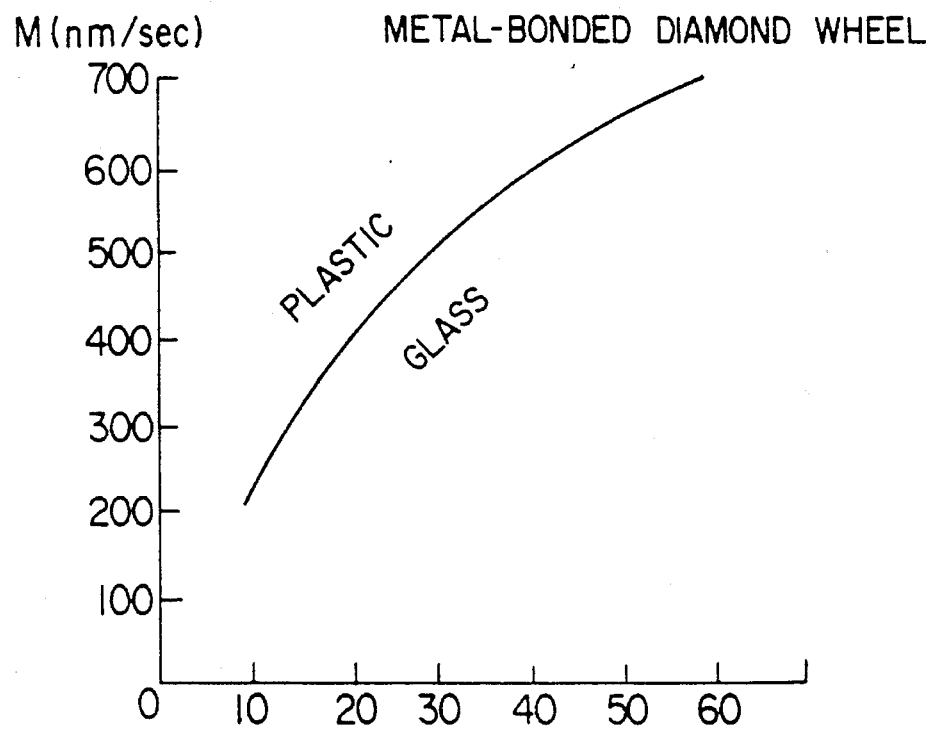
FIG. 11 is a graph of the results of polishing according to the polishing process of the other embodiment of the present invention (relationship between pressing pressure and polishing rate)
Figure 12:
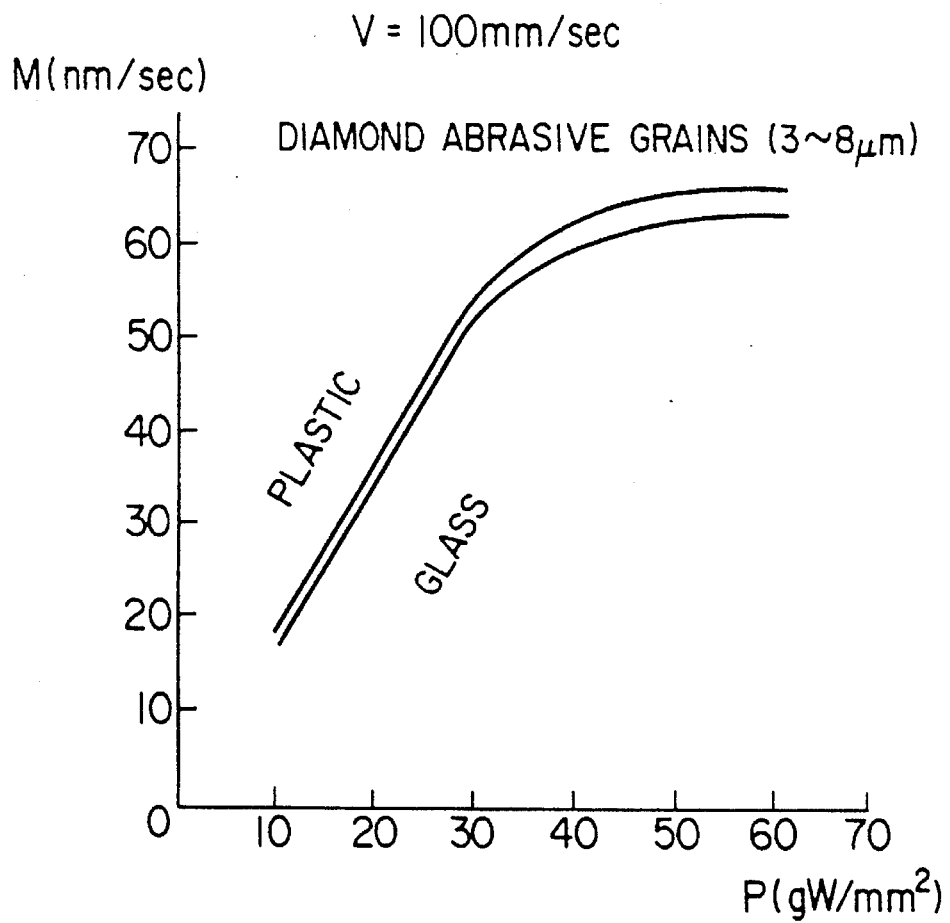
FIG. 12 is a graph of the results of polishing according to a conventional polishing process using free abrasive grains (relationship between pressing pressure and polishing rate)

First, examples will be explained below comparing the polishing process using fixed abrasive grains and polishing process using free abrasive grains. FIGS. 10 and 11 are graphs showing the results of polishing by the polishing process of the present invention (relationships of pressing pressure P and polishing efficiency), while FIG. 12 is a graph showing the results of polishing by the conventional polishing process using free abrasive grains (relationship of pressing pressure and polishing efficiency). The polishing time is 30 seconds in FIGS. 10–12.

In the example of polishing the end face of an optical connector assembly by the conventional polishing process using free abrasive grains shown in FIG. 12, the polishing efficiency M per unit time (nm/sec) was measured placing diamond abrasive grains on a buff and under a polishing speed V of 100 mm/sec and pressing a plastic material and glass material with various pressures P (gw/mm$^2$).

From these results, it will be understood that the amount of polishing per unit time of the plastic material is greater than the amount of polishing of the glass material and if these are simultaneously polished, the plastic is polished faster. The problem of the ends of the optical fibers sticking out from the end face of the optical connector will occur.

As opposed to this, FIG. 10 shows an example in the case of a polishing process using a resin-bonded diamond wheel comprised of a fixed abrasive grain wheel of a no. 2000 roughness and a polishing speed V of 2000 mm/sec. FIG. 11 is the same graph as FIG. 10 except of using a metal-bonded diamond wheel.

In those cases, the amounts of polishing per unit time of the plastic material and the glass material are the same. Therefore, the optical fibers 14 will not stick out from the end face 10b of the optical connector 10.

Figure 13:
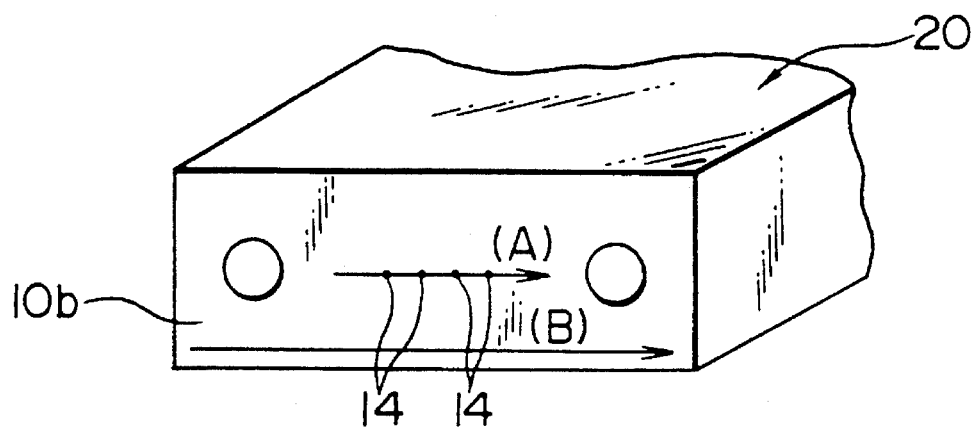
FIG. 13 is a schematic view showing an end face of an optical connector assembly and measurement positions.

Another examples will be explained below with reference to FIGS. 13–15.

Figure 14B:
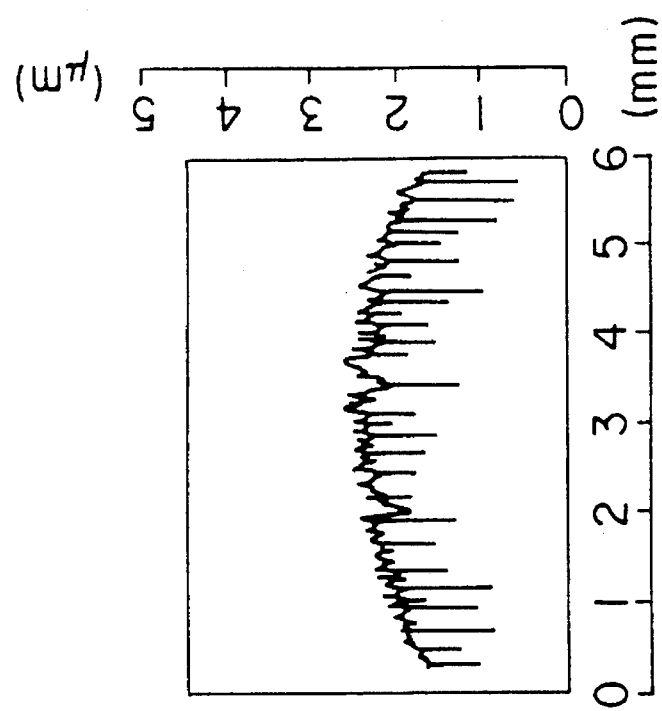
FIG. 14 is a graph showing surface roughness of an end face of an optical connector assembly polished by conventional polishing process.
Figure 14A:
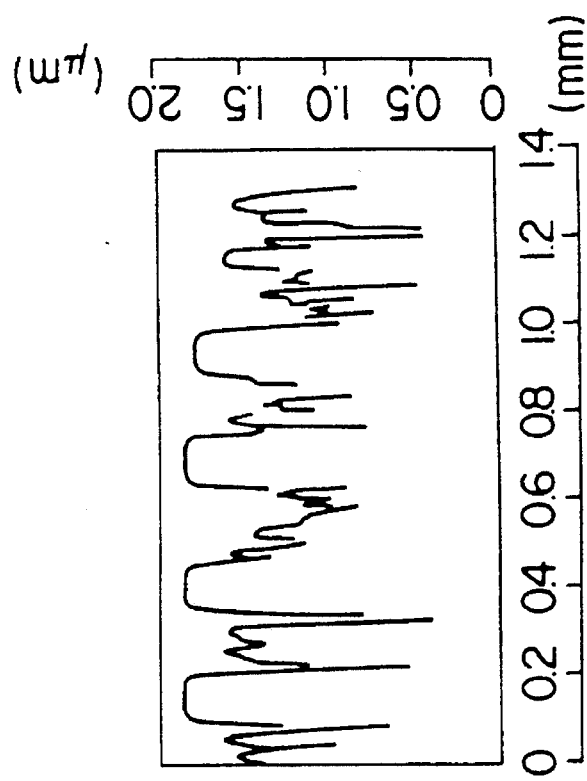

In an example of polishing the end face 10b of an optical connector assembly 20 by the conventional polishing process using free abrasive grains, flatness of the end face 10b is shown in FIG. 14. FIG. 14(A) shows the sticking out tendency of optical fibers from the optical connector along measurement points "A" in FIG. 13, while FIG. 14(B) shows the flatness tendency along measurement points "B" in FIG. 13.

Figure 15B:
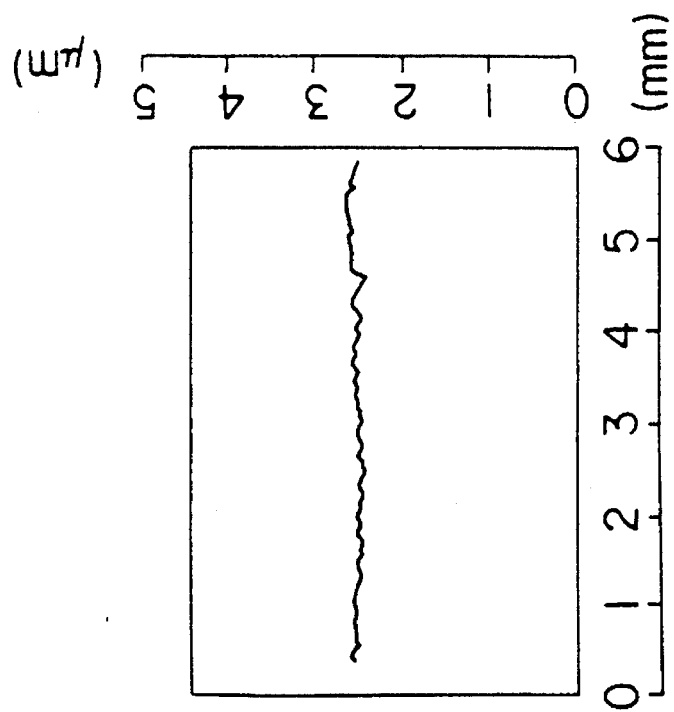
FIG. 15 is a graph showing surface roughness of an end face of an optical connector assembly polished by a polishing process of the present invention.
Figure 15A:
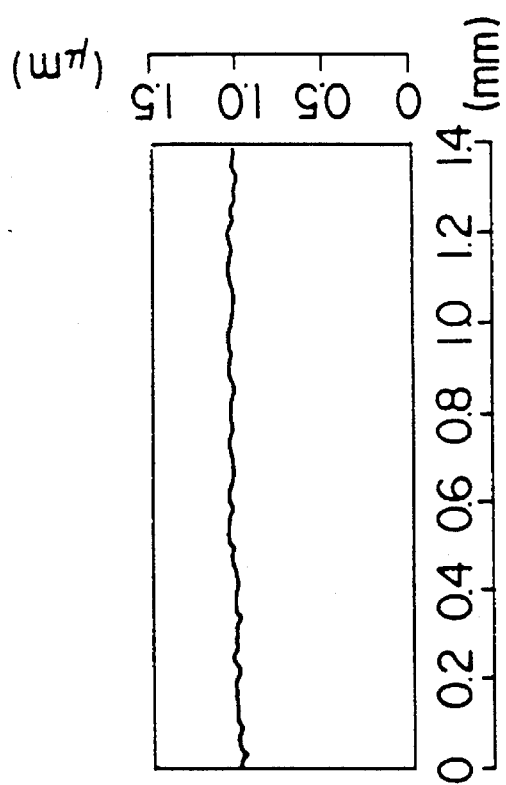

In an example of polishing the end face 10b of an optical connector assembly 20 by the polishing process of the invention using fixed abrasive grains, flatness of the end face 10b shown in FIG. 15. FIG. 15(A) shows the sticking out of optical fibers from optical connector along measurement points "A" in FIG. 13, while FIG. 15(B) shows the flatness along measurement points "B" in FIG. 13.

Comparing FIG. 15 with FIG. 14, it is confirmed that the ends of the optical fibers 14 don't stick out from the end face 10b and the flatness is improved within 0.2 μm in accordance with the present invention. Namely, the quality of polishing process is improved according to the present invention.

Next, an explanation will be made of a method of setting the polishing conditions in the polishing steps of the present invention, which is comprised of the above-mentioned four polishing steps, taking the third polishing step as an example.

Figure 16:
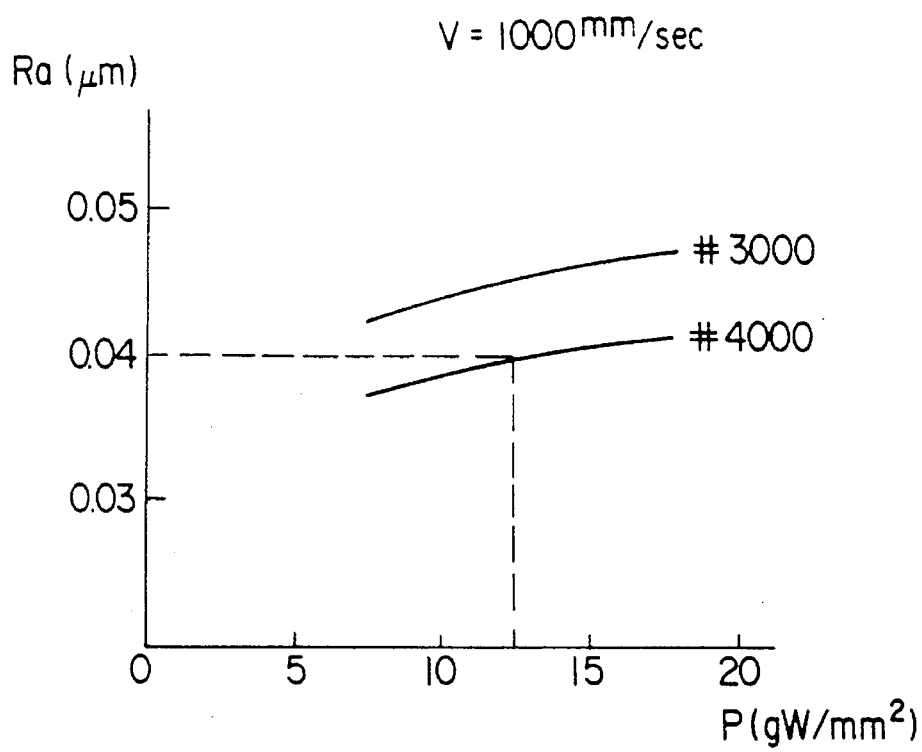
FIG. 16 is a graph of the results of polishing according to the polishing process of one embodiment of the present invention (relationship between pressing pressure and surface roughness)
Figure 18:
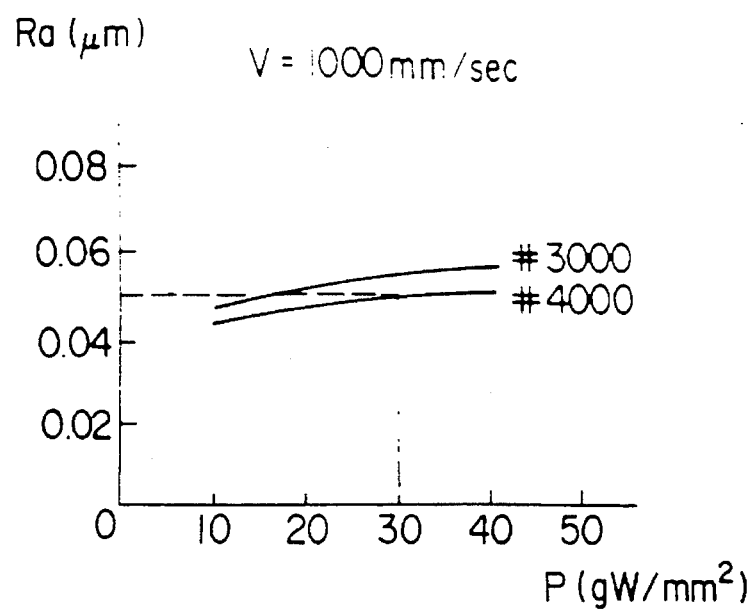
FIG. 18 is a graph of the results of polishing according to the polishing process of the other embodiment of the present invention (relationship between pressing pressure and surface roughness)

FIG. 16 shows the relationship between the pressing pressure P of the optical connector assembly 20 to the metal-bonded diamond wheel in the case of a polishing speed V of 1000 mm/sec and the surface roughness Ra of the polished end face of the optical connector assembly. FIG. 18 shows the same graph as FIG. 16 except of using the resin-bonded diamond wheel.

If the surface roughness Ra targeted in the third polishing step is less than 0.04 µm, when the metal-bonded diamond abrasive wheel of a no. 4000 roughness is used, the pressing pressure P has to be set to less than 13 gw/mm² as shown in FIG. 16. When using the resin-bonded diamond wheel, the pressing pressure is determined to be less than 30 gw/mm² as shown in FIG. 18 in the same manner as in FIG. 16. In this case, the surface roughness Ra is enough to be 0.05 µm, since polishing damage rarely occurs. Note that it was attempted to use a positioning control apparatus with a 1 µm resolution of feed of the optical connector assembly to the abrasive wheel and polish by a polishing process using fixed abrasive grains, but a resolution of 1 µm is too rough, so a sufficiently good finishing precision could not be obtained.

In this regard, there is the method of making the resolution the seemingly required several fractions of an nm, but this would lead to a larger size of the apparatus and a higher cost, so, as shown in FIG. 1, it is preferable to use a polishing apparatus of a structure where the workpiece is pressed against the fixed abrasive grain abrasive wheel with a constant load.

With this system, so long as the load pressing the optical connector assembly against the abrasive wheel was over 5 g in each of the steps, a satisfactory finish of the optical connector assembly could be obtained. Note that when the pressing load was less than 5 g, there were problems such as attendant vibration during the polishing and a stable quality of polishing could not be obtained.

Figure 17:
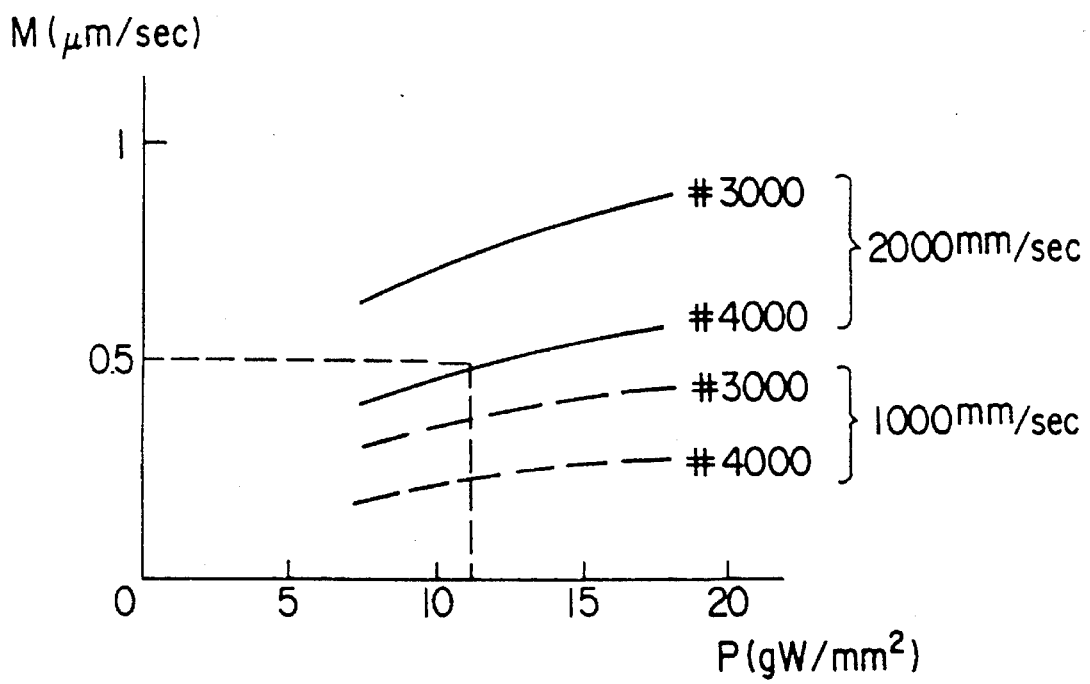
FIG. 17 is a graph of the results of polishing according to the polishing process of the one embodiment of the present invention (relationship between pressing pressure and polishing efficiency)
Figure 19:
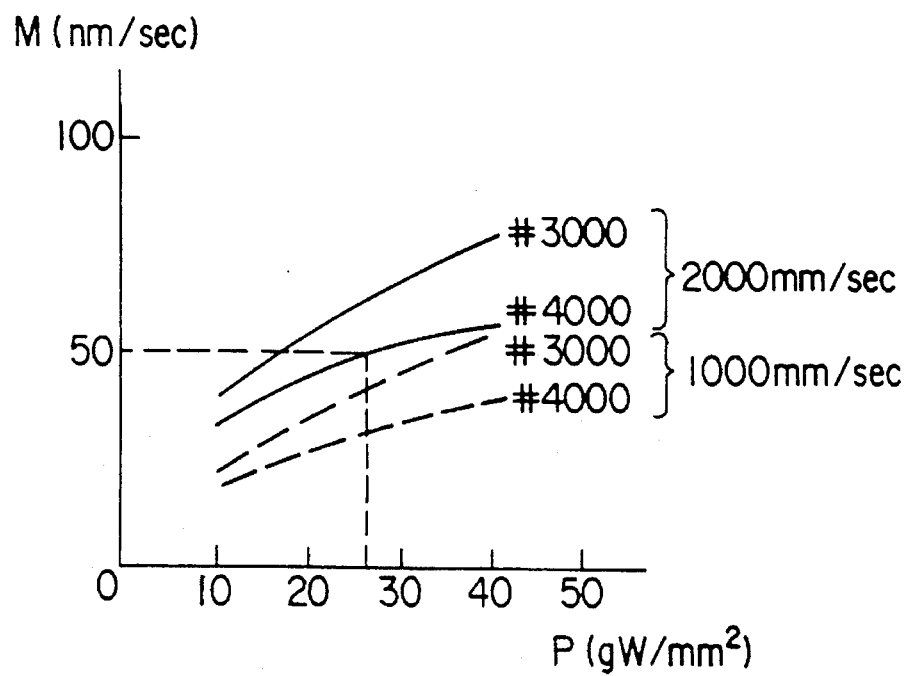
FIG. 19 is a graph of the results of polishing according to the polishing process of the other embodiment of the present invention (relationship between pressing pressure and polishing efficiency)
Figure 20:
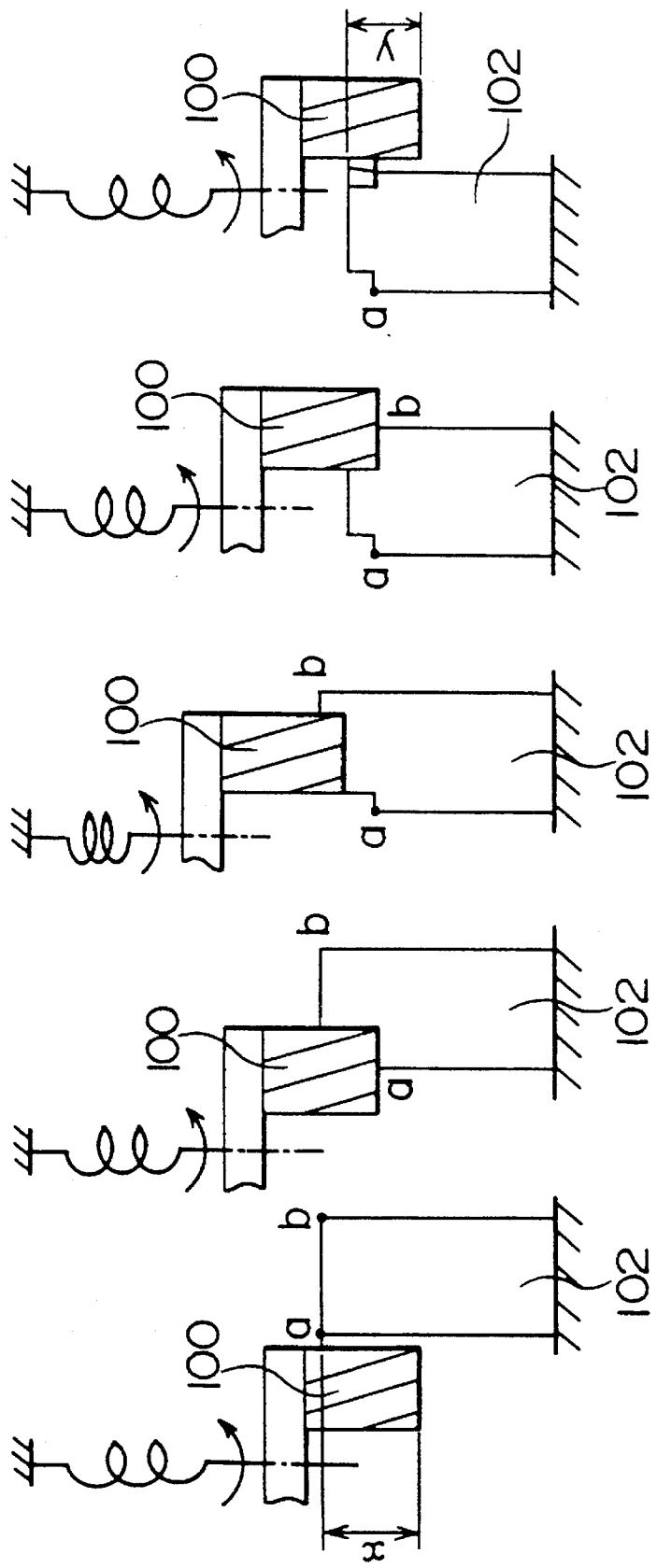
FIG. 20 is a schematic view showing a conventional polishing process with feed controlled system to workpiece.
Figure 21:
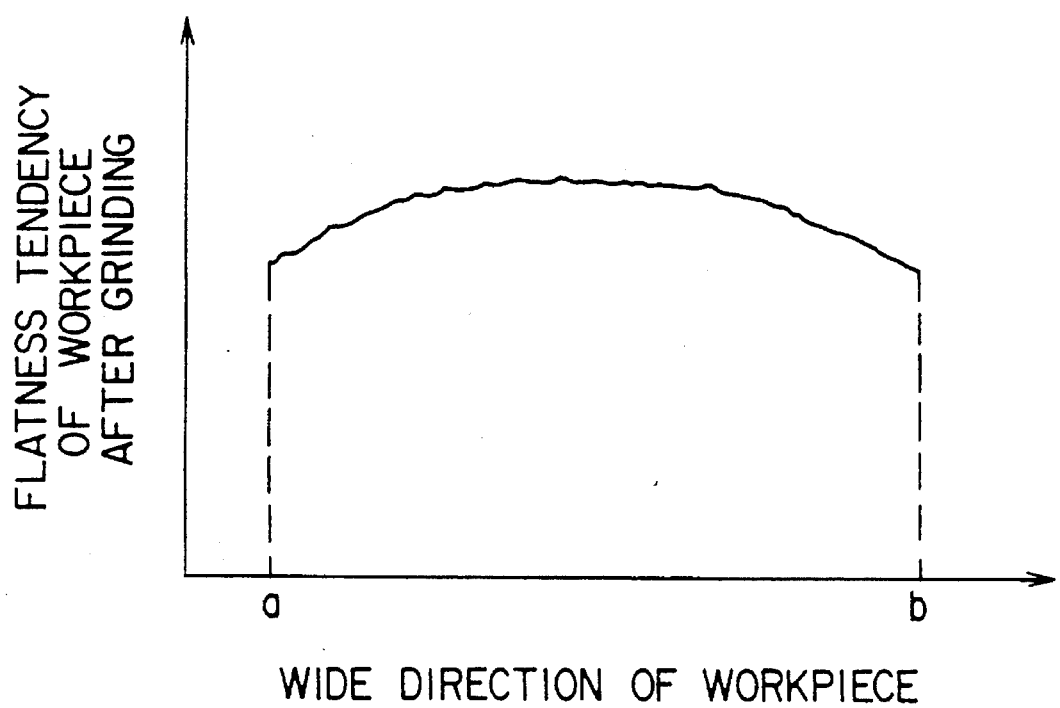
FIG. 21 is a graph showing the flatness of the workpiece obtained by the conventional polishing process.

FIGS. 17 and 19 show the relationship between the pressing pressure P and the polishing efficiency M. When using a metal-bonded diamond abrasive wheel, if the target polishing efficiency M of the third step is made 0.5 µm/sec, it is not possible to obtain the target polishing efficiency with a polishing speed V of 1000 mm/sec and a pressing pressure P of less than 11 gw/mm².

Therefore, as shown in FIG. 16, to simultaneously satisfy the conditions of Ra<0.04 µm and M=0.5 nm/sec, it is necessary to use a metal-bonded diamond abrasive wheel of a no. 4000 roughness and to make the pressing pressure P more than 11 gw/mm² and the polishing speed M more than 2000 mm/sec as shown in FIG. 17.

When using resin-bonded diamond wheel, the pressing pressure is determined to be more than 26 gw/mm² and the polishing speed M is determined to be 2000 mm/sec as shown in FIG. 19 in the same manner as in FIG. 17.

It is possible to set the polishing conditions of the third step by the above procedure. It is also possible to set the polishing conditions in the same way for the other steps.

Note that as mentioned earlier, the polishing process of the present invention need only be a polishing process of the load pressing type using fixed abrasive grains. The number of steps, the polishing conditions, etc. are not limited to those of the embodiment and may be changed in various ways, but when four polishing steps are used as in the above-mentioned embodiment, the efficiency becomes better since the greater the number of steps comprising the fixed abrasive grain process, the better in terms of efficiency.

On the other hand, in terms of quality, it is necessary to consider the combination of which steps to perform by fixed abrasive grains and which steps to perform by free abrasive grains in the second polishing step to the fourth polishing step so as to solve the problem of protrusion of the fibers.

The present inventors performed experiments from this perspective making the amount of polishing of the second polishing step 10 to 20 µm, the amount of polishing of the third polishing step 5 to 10 µm, and the amount of polishing of the fourth polishing step 3 to 5 µm. The results are shown in Table 1.

In Table 1, the mark ⊙ indicates a zero amount of protrusion, the mark o indicates less than 0.1 µm protrusion, the mark A indicates less than 0.1 µm protrusion with a total of 8 µm polishing in the, third and fourth polishing steps, and the mark x indicates over 0.1 µm protrusion. And in Table 1, the fixed abrasive grains in 2nd and 3rd polishing steps mean metal-bonded diamond wheel, while the fixed abrasive grains in 4th polishing step mean liquid-bonded wheel.

As will be understood from the results of Examples 1 to 4 in Table 1, if fixed abrasive grains are used in the final polishing step, the best results can be obtained regardless of the type of the abrasive grains used in the second polishing step and the third polishing step.

However, even when performing the polishing in the final step by free abrasive grains without the use of fixed abrasive grains, as will be understood from the results of Examples 5 to 6, if the amount of polishing by the free abrasive grains is slight and the polishing step just before was polishing by fixed abrasive grains, satisfactory results can be obtained. Further, as shown by Example 7, even when the final polishing step and the polishing step just before it are polishing using free abrasive grains, when the overall amount of polishing of the two polishing steps is small, substantially the same result is obtained as with Example 5 or Example 6. Therefore, in the present invention, it may be said that if the amount of polishing by free abrasive grains after the polishing by fixed abrasive grains is kept below about 8 µm, it is possible to suppress the amount of protrusion to under 0.1 µm.

TABLE 1

| | 2nd polishing step | 3rd polishing step | 4th polishing step | Evaluation |
|---|---|---|---|---|
| Ex. 1 | Fixed abrasive grains | Fixed abrasive grains | Fixed abrasive grains | ⊙ |
| Ex. 2 | Free abrasive grains | Fixed abrasive grains | Fixed abrasive grains | ⊙ |
| Ex. 3 | Free abrasive grains | Free abrasive grains | Fixed abrasive grains | ⊙ |
| Ex. 4 | Fixed abrasive grains | Free abrasive grains | Fixed abrasive grains | ⊙ |
| Ex. 5 | Fixed abrasive grains | Fixed abrasive grains | Free abrasive grains | o |
| Ex. 6 | Free abrasive grains | Fixed abrasive grains | Free abrasive grains | o |
| Ex. 7 | Fixed abrasive grains | Free abrasive grains | Free abrasive grains | Δ |
| Comp. Ex.1 | Free abrasive grains | Free abrasive grains | Free abrasive grains | X |

Many widely different embodiments of the present invention may be constructed without departing from the spirit and scope of the present invention, and it should be understood that the present invention is not restricted to the specific embodiments described above.

We claim:

1. A polishing process for a multiple optical fiber connector assembly with at least two optical fibers, comprising the steps of:

attaching at least two optical fibers to an optical connector made of a different material from that of the optical fibers with the optical fibers exposed from an end face of the optical connector; and polishing the end face of the connector with the optical fibers exposed from the end face by pressing the end face against a flat surface of a rotating abrasive wheel containing fixed abrasive grains at a constant load and moving the end face linearly and reciprocally in a chord direction perpendicular to a radial direction of the rotating abrasive wheel producing a mechanochemical reaction.

2. The polishing process as recited in claim 1, wherein a reciprocal moving region of the multiple optical fiber connector is within approximately an angle of 90 degrees of the rotating abrasive wheel.

3. The polishing process as recited in claim 1, wherein the rotating abrasive wheel comprises metal-bonded diamond wheel.

4. The polishing process as recited in claim 1, wherein the rotating abrasive wheel comprises a liquid-bonded wheel formed by mixing and hardening a powder, of at least one selected from among cerium oxide, aluminum oxide, chromium oxide, and silicon oxide, with a liquid bond, and the multiple optical fiber connector assembly with the optical fiber is polished by a mechanochemical reaction.

5. A polishing process for a multiple optical fiber connector assembly with at least two optical fibers, comprising the steps of:

attaching at least two optical fibers to an optical connector made of a different material from that of the optical fibers with the optical fibers exposed from an end face of the optical connector; and polishing the end face of the connector with the optical fibers exposed from the end face via at least two polishing steps with a last polishing step comprising polishing the end face of the connector with the optical fibers exposed therefrom by pressing the end face against a flat surface of a rotating abrasive wheel containing fixed abrasive grains at a constant load and moving the end face linearly and reciprocally in a chord direction perpendicular to a radial direction of the rotating abrasive wheel producing a mechanochemical reaction.

6. The polishing process as recited in claim 5, wherein the last polishing step uses a liquid-bonded wheel of a fixed abrasive grain wheel kind and others of the at least two polishing steps use a metal-bonded diamond wheel.

7. A polishing apparatus for a multiple optical fiber connector assembly with at least two optical fibers, comprising:

abrasive wheel rotational drive means for mounting and rotating an abrasive wheel having fixed abrasive grains;

holding means for holding the multiple optical fiber connector assembly with the optical fibers extending from an end face of the multiple optical fiber connector assembly with the optical fibers and facing a flat polishing surface of the abrasive wheel mounted on the abrasive wheel rotational drive means;

movement means for enabling relative movement of the end face of the multiple optical fiber connector assembly held by the holding means and the flat polishing surface of the abrasive wheel; and constant load means for pressing the end face of the multiple optical fiber connector assembly with the optical fibers extending therefrom against the flat polishing surface of the rotating abrasive wheel at a constant load producing a mechanochemical reaction.

8. The polishing apparatus as recited in claim 7, further comprising movable truing means for correcting the flat polishing surface of the abrasive wheel, which movable truing means moves in parallel to an axial direction of the rotating abrasive wheel for cutting into the flat polishing surface of the abrasive wheel and in parallel to the flat polishing surface.

9. The polishing apparatus as recited in claim 7, wherein the abrasive wheel is a metal-bonded diamond wheel.

10. The polishing apparatus as recited in claim 7, wherein the abrasive wheel is a liquid-bonded wheel formed by mixing and hardening a powder of at least one selected from among certain oxide, aluminum oxide, chromium oxide, and silicon oxide with a liquid bond.

11. The polishing apparatus as recited in claim 7, wherein said movement means moves the multiple optical fiber connector assembly along a chord of the abrasive wheel.

12. A polishing process for a multiple optical fiber connector assembly having at least two optical fibers, comprising:

forming an optical fiber connector of a first material and having the at least two optical fibers of a second different material extending from an end face of the connector; and moving the end face against a flat surface of a fixed abrasive grain rotating abrasive wheel linearly and reciprocally along a chord perpendicular to a radial of the rotating abrasive wheel producing a mechanochemical reaction.

13. A polishing process for a multiple optical fiber connector assembly with at least two optical fibers, comprising the steps of:

fixing at least two optical fibers in an optical connector assembly made of a different material from that of the optical fibers with the optical fibers exposed from an end face of the optical connector assembly;

polishing an end face of the connector assembly with the exposed optical fibers while pressing the connector assembly against a flat polishing surface of a rotating liquid bonded abrasive wheel containing fixed abrasive grains with a constant load and moving the connector assembly linearly and reciprocally in a chord direction perpendicular to a radial direction of the rotating abrasive wheel producing a mechanochemical reaction during the polishing; and correcting the flat polishing surface of the rotating abrasive wheel by means of a movable truing means which has a tip end in contact with the flat polishing surface of the rotating abrasive wheel at one point and moves in parallel to an axial direction of the rotating abrasive wheel for cutting into the flat polishing surface of the abrasive wheel and in parallel to the flat polishing surface.

14. The polishing process as recited in claim 13, wherein the liquid-bonded wheel is formed by mixing and hardening a powder of at least one of cerium oxide, aluminum oxide, chromium oxide, and silicon oxide with a liquid bond providing the liquid-bonded wheel with characteristics of high-concentration in volume, low bonding strength and inelasticity.

15. The polishing process as recited in claim 13, wherein a reciprocal moving region of the multiple optical fiber connector assembly is within an angle of 90 degrees of the rotating abrasive wheel.

16. The polishing process as recited in claim 13, the correcting step uses the movable truing means comprising a diamond tool.

17. A polishing apparatus for a multiple optical fiber connector assembly with at least two optical fibers, said apparatus comprising:

a rotating fixed abrasive wheel comprising a liquid-bonded wheel with free abrasive grains, and polishing the multiple optical fiber connector assembly with the optical fibers by mechanochemical reaction;

an abrasive wheel rotational drive means for mounting and rotating the rotating abrasive wheel;

holding means for holding the multiple optical fiber connector assembly with the optical fibers with an end face of the multiple optical fiber connector assembly having the optical fibers facing a flat polishing surface of the rotating abrasive wheel mounted on the abrasive wheel rotational drive means;

movement means for enabling movement of a relative position of the end face of the multiple optical fiber connector assembly held by the holding means and the polishing surface of the rotating abrasive wheel;

constant load means for pressing the end face of the multiple optical fiber connector assembly with the optical fibers against the flat polishing surface of the rotating abrasive wheel producing a mechanochemical reaction; and movable truing means for correcting the flat surface of the rotating abrasive wheel, having a tip end in contact with the flat polishing surface of the rotating abrasive wheel at one point and moving in parallel to an axial direction of the rotating abrasive wheel and cutting into the flat polishing surface of the abrasive wheel in parallel to the flat polishing surface.

18. The polishing apparatus as recited in claim 17, wherein the liquid-bonded wheel is formed by mixing and hardening a powder of at least one of cerium oxide, aluminum oxide, chromium oxide, and silicon oxide with a liquid bond providing the liquid-bonded wheel with characteristics of high-concentration in volume, low bonding strength and inelasticity.

19. The polishing apparatus as recited in claim 17, wherein the movable truing means comprises a diamond tool.

20. A polishing process for a multiple optical fiber connector assembly with at least two silica type optical fibers, comprising the steps of:

fixing the at least two optical fibers in an optical connector made of a different material from that of the optical fibers with the optical fibers exposed from an end face of the optical connector; and polishing the end face of the connector with the optical fibers exposed from the end face via at least two polishing steps with a last polishing step comprising polishing the end face of the connector with the optical fibers exposed therefrom by pressing the end face against a flat surface of a rotating abrasive wheel comprising a fixed abrasive wheel causing a mechanochemical reaction.

21. The polishing process as recited in claim 20, wherein the fixed abrasive wheel comprises a liquid-bonded wheel formed by mixing, heating and hardening a powder of at least one of cerium oxide, aluminum oxide, chromium oxide, and silicon oxide with a liquid bond providing the liquid-bonded wheel with a characteristic of high-concentration, low bonding strength and inelasticity.

22. The polishing process as recited in claim 21, wherein a weight percent of the liquid bond is not more than 3 weight percent of a total weight of the liquid-bonded wheel after hardening.

* * * * *

UNITED STATES PATENT AND TRADEMARK OFFICE
CERTIFICATE OF CORRECTION

PATENT NO. : 5,480,344
DATED : January 2, 1996
INVENTOR(S) : Xu et al.

It is certified that error appears in the above-indentified patent and that said Letters Patent is hereby corrected as shown below:

Title Page, References Cited, [56], delete "3,566,224 1/1971" and insert therefor --4,566,224 1/1986--;

Column 5, line 4, after "by", insert --a--.

Column 10, line 52, delete "lob" and insert therefor --10b--.

Column 12, line 14, delete "A" and insert therefor --Δ--.

Signed and Sealed this

Seventh Day of May, 1996

Attest:

BRUCE LEHMAN

*Attesting Officer*    *Commissioner of Patents and Trademarks*